Patented Jan. 12, 1926.

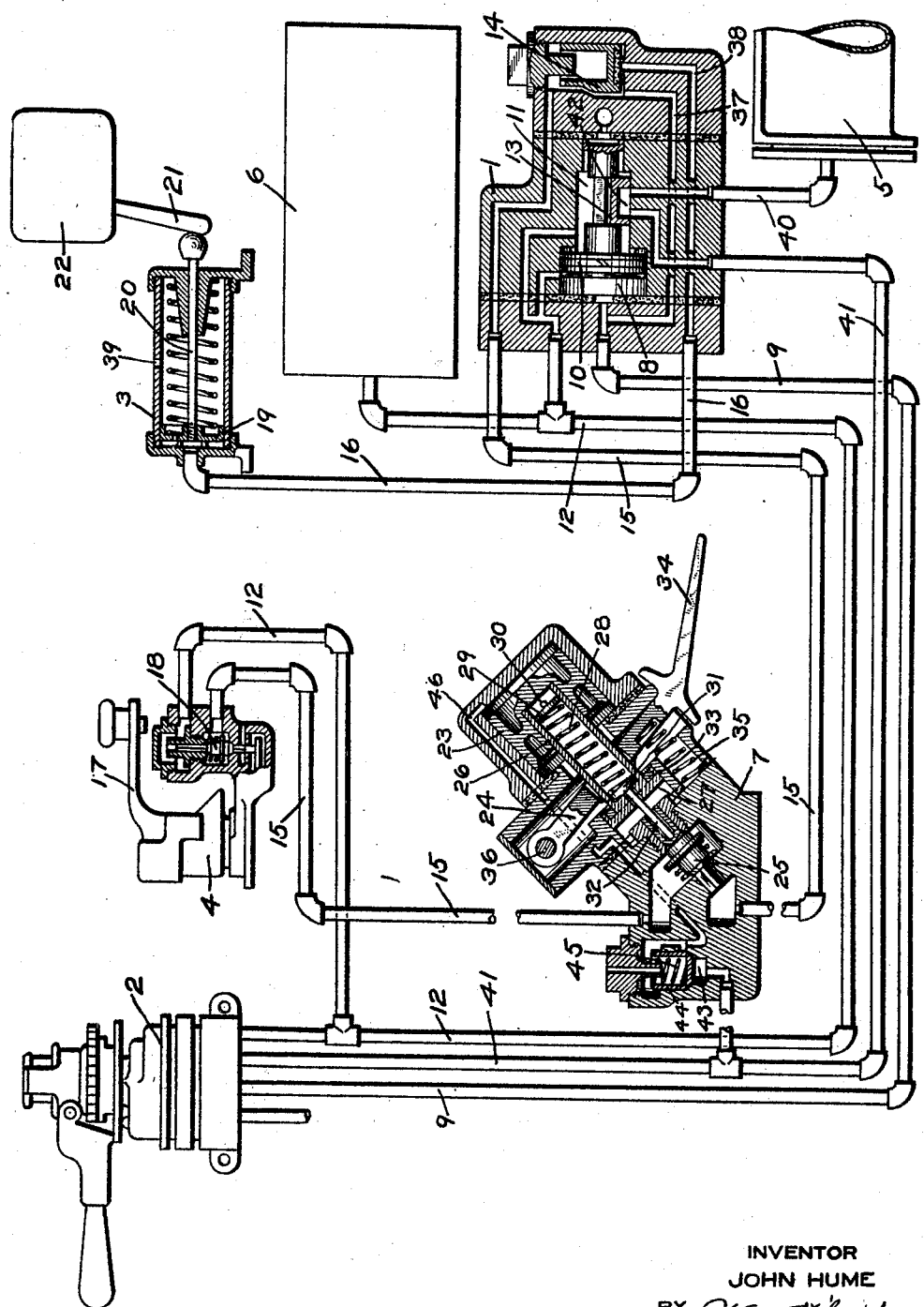

1,569,087

UNITED STATES PATENT OFFICE.

JOHN HUME, OF HOUSTON, TEXAS, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE DEVICE.

Application filed January 22, 1924. Serial No. 687,858.

*To all whom it may concern:*

Be it known that I, JOHN HUME, a citizen of the United States, residing at Houston, in the county of Harris and State of Texas, have invented new and useful Improvements in Fluid-Pressure Brake Devices, of which the following is a specification.

This invention relates to safety car control equipments of the type employing a foot valve device operative to render the safety features inoperative when a straight air application of the brakes is made and also adapted to be operated by the foot of the operator, so as to prevent the operation of the safety features when the hand is removed from the controller handle.

The principal object of my invention is to provide an improved foot valve device of the above character.

In the accompanying drawing, the single figure is a diagrammatic view of a safety car control equipment, showing my improved foot valve device applied thereto, the foot valve device being shown in section on an enlarged scale.

As shown in the drawing, the equipment may comprise the usual safety car control parts including an emergency valve device 1, a brake valve device 2, a circuit breaker cylinder 3, a safety control handle device 4, a brake cylinder 5, and a main reservoir 6. In addition, a foot valve device 7, constructed in accordance with my invention, is provided.

The emergency valve device 1 may comprise a casing having a piston chamber 8 connected to the usual emergency brake pipe 9 and containing piston 10 and valve chamber 11 connected to main reservoir pipe 12 and containing a slide valve 13 adapted to be operated by piston 10. Also included in the emergency valve casing is a relay valve 14 having one side connected to the safety control pipe 15 and the other side to a pipe 16 leading to the circuit breaker cylinder 3.

The safety control handle device 4 may comprise a depressible handle 17 for controlling the operation of a pilot valve 18, as well as serving as the usual power controller handle. The circuit breaker cylinder 3 contains a piston 19 having a piston stem 20, the outer end of which engages the handle 21, of a power circuit breaker 22.

The improved foot valve device 7 comprises three casing sections, the upper section containing a piston 23; the intermediate section a pedal lever 24; and the lower section a double beat valve 25.

Centrally mounted within the piston 23 is a sleeve 26 having a flange 27 at its lower end, the pedal lever 24 being provided with an opening through which said sleeve extends. Mounted in the sleeve 26 is a coil spring 28 having the upper end engaging a disk 29 which is held in place by a pin 30 and having its lower end engaging a disk 31.

The disk 31 engages a pin 32 which extends through the flange 27 and extends into a central cavity of the double beat valve 25. A steel ring 33 is mounted in an annular recess in the upper face of flange 27 and engaging said ring on opposite sides of the sleeve 26 are curved nubs carried by the lever 24. The pedal portion 34 of the lever 24 is flat and projects out at an angle such that the operator's foot may most comfortably engage same. A spring 35 acts on lever 24 and tends to maintain same in its normal upper position, the lever being pivotally mounted on a pin 36.

In operation, if the operator releases the controller handle 17, the pilot valve 18 is moved upwardly in the usual manner, so that fluid is vented from the safety control pipe 15. Fluid under pressure is thus vented from the top of the relay valve 14, past the open valve 25 of the foot valve device and the relay valve is then operated so as to vent fluid from the brake pipe 9 through passage 37, past the open relay valve 14 to passage 38 and thence through pipe 16 to piston 19 of the circuit breaker cylinder 3. The piston 19 then moves out, causing the piston stem 20 to throw the handle 21 of the circuit breaker 22, so as to cut off the power to the car.

When piston 19 passes over the exhaust port 39, fluid is vented from pipe 16 to the atmosphere and consequently the emergency brake pipe pressure is reduced to effect the movement of the emergency piston 10 to emergency position. In this position, slide valve 13 uncovers pipe 40 to valve chamber 11, so that fluid is supplied from the main reservoir 6 to the brake cylinder to effect an emergency application of the brakes.

If the operator wishes to release the controller handle 17 without causing the operation of the safety features as above described he may do so by first making a service application of the brakes through operation of the brake valve device 2 in the usual manner. Fluid under pressure is then supplied from the brake valve device through the straight air pipe 41 and cavity 42 in slide valve 13 to the brake cylinder 5 to effect a service application of the brakes. At the same time, fluid from the straight air pipe 41 is supplied to the chamber 43 below the valve 44 in the foot valve device 7. When the straight air pressure is sufficient to overcome the tension of spring 45, the valve 44 lifts from its seat, permitting flow of fluid through passage 46 to the chamber above piston 23. The piston 23 and the sleeve 26 are then shifted downwardly, causing the movement of pin 32 to effect the shifting of valve 25 to its lower seat.

Communication through safety control pipe 15 is thus cut off, so that if the controller handle 17 be released at this time, the opening of the pilot valve 18 will not be effective to vent fluid from the relay valve 14. By operating the pin 32 through the action of spring 28 instead of by direct contact with the sleeve 26, the seating of valve 25 as well as the seating of piston 23 is assured, since after the valve 25 seats, further movement of piston 23 to its seat will be permitted by the yielding of spring 28.

The operator may also prevent the functioning of the pilot valve 18 upon release of the controller handle 17, by depressing the pedal 34 with his foot. This effects the downward movement of the sleeve 26, by engagement of the nubs on the lever 24 with the ring 33, so that the valve 25 is moved to its seat, cutting off communication through the safety control pipe 15.

By locating the valve operating means intermediate the piston and the valve, the piston chamber above the piston can be sealed against leakage of air, without providing a sealing valve associated with the foot operated plunger as heretofore employed and the angle at which the foot of the operator engages the foot pedal can be so disposed as to reduce strain on the foot.

Having now described my invention, what I claim as new and desire to secure by Letters Patent, is:—

1. In a safety car control equipment, the combination with a safety control pipe, a valve for controlling communication through said pipe, and a piston operated by fluid under pressure for operating said valve, of foot controlled means for also operating said valve, said means being operatively connected to said valve at a point intermediate the valve and the piston.

2. In a safety car control equipment, the combination with a safety control pipe, a valve for controlling communication through said pipe, a fluid operated piston, and means operatively connecting said piston with said valve, of a foot operated lever disposed intermediate the valve and the piston for also operating said valve.

3. In a safety car control equipment, the combination with a safety control pipe, a valve for controlling communication through said pipe, a fluid operated piston, and a member interposed between said valve and said piston, of a foot operated lever engaging said member for also operating said valve.

4. In a safety car control equipment, the combination with a safety control pipe, a valve for controlling communication through said pipe, and a piston operated by fluid under pressure for operating said valve, of a sleeve interposed between said piston and said valve and provided with a flange and a foot operated lever straddling said sleeve and adapted to engage said flange for also operating said valve.

5. In a safety car control equipment, the combination with a safety control pipe and a straight air pipe, of a valve for controlling communication through said safety control pipe, a piston operated by fluid in the straight air pipe for actuating said valve, and a foot operated lever interposed between said valve and said piston for also operating said valve.

In testimony whereof I have hereunto set my hand.

JOHN HUME.